US012513456B2

(12) United States Patent
Fukui et al.

(10) Patent No.: US 12,513,456 B2
(45) Date of Patent: Dec. 30, 2025

(54) SOUND SYSTEM

(71) Applicant: NTT, Inc., Tokyo (JP)

(72) Inventors: Masahiro Fukui, Tokyo (JP); Kazunori Kobayashi, Tokyo (JP); Noriyoshi Kamado, Tokyo (JP); Ryotaro Sato, Tokyo (JP)

(73) Assignee: NTT, Inc., Tokyo (JP)

( * ) Notice: Subject to any disclaimer, the term of this patent is extended or adjusted under 35 U.S.C. 154(b) by 137 days.

(21) Appl. No.: 18/277,942

(22) PCT Filed: Feb. 24, 2021

(86) PCT No.: PCT/JP2021/006871
§ 371 (c)(1),
(2) Date: Aug. 18, 2023

(87) PCT Pub. No.: WO2022/180686
PCT Pub. Date: Sep. 1, 2022

(65) Prior Publication Data

US 2024/0129663 A1 Apr. 18, 2024

(51) Int. Cl.
*H04R 1/32* (2006.01)

(52) U.S. Cl.
CPC .................................... *H04R 1/323* (2013.01)

(58) Field of Classification Search
CPC ...... H04R 1/323; H04R 3/12; H04R 2499/13; H04R 1/403; H04R 5/023
See application file for complete search history.

(56) References Cited

U.S. PATENT DOCUMENTS

2010/0041443 A1 2/2010 Yokota

FOREIGN PATENT DOCUMENTS

JP S6195189 U 6/1986
JP 2010045574 A 2/2010

OTHER PUBLICATIONS

In-flight entertainment/Japan Airline first class, [online], [Searched on Feb. 1, 2021], Internet <URL: https://www.jal.co.jp/jp/ja/inter/service/first/entertainment/index.html> with its English version.

Articles presented on "Ntt R&D Forum 2020 Connect"; A-15, Nov. 16, 2020, Internet <URL: https://www.rd.ntt/forum/> 1. Explanatory panel: Media Processing Device Technology in the Remote World Era; Deliver only the sounds you want to hear_ with its English translation; 2. Figures; and 3. Online article: Media processing technology for personalized sound zone; Delivering only sounds you want to make known/heard_ with its English translation generated by computer.

*Primary Examiner* — Kile O Blair

(57) ABSTRACT

There is provided an acoustic system for a user who uses a seat of an airplane, an automobile, or the like, which reproduces a sound that cannot be heard by surrounding users without using earphones or headphones. An acoustic system including a speaker system including one speaker unit that emits a sound based on an acoustic signal of a predetermined sound source, in which a sound emitted from the speaker unit is hearable in a region to be audible near the speaker unit, and by a sound emitted from the speaker unit in a back surface direction coming around to a front surface direction, the sound emitted from the speaker unit in the front surface direction and the sound emitted from the speaker unit in the back surface direction cancel each other in a region in the front surface direction far from the speaker unit.

2 Claims, 17 Drawing Sheets

SOUND SYSTEM

CROSS-REFERENCE TO RELATED APPLICATIONS

This application is a U.S. 371 Application of International Patent Application No. PCT/JP2021/006871, filed on 24 Feb. 2021, the disclosure of which is hereby incorporated herein by reference in its entirety.

TECHNICAL FIELD

The present invention relates to a sound reproduction technology that can be used in an audio system installed in a seat of an aircraft, an automobile, or the like.

BACKGROUND ART

Conventionally, a user uses earphones or headphones to view and listen to movies or music in an aircraft (see Non Patent Literature 1). This is because when a speaker is used, the reproduced sound reaches the periphery of the user, which causes trouble to other users.

CITATION LIST

Non Patent Literature

Non Patent Literature 1: In-flight entertainment/JAL-first class, [online], [searched on Feb. 1, 2021], Internet <URL: https://www.jal.co.jp/jp/ja/inter/service/first/entertainment/index.html>

SUMMARY OF INVENTION

Technical Problem

However, wearing earphones or headphones is troublesome for the user. In addition, there are users who do not like wearing due to, for example, disheveling of hair. Some users do not like pressure on their ears due to wearing. Furthermore, wearing earphones or headphones for a long time may make the user feel tired of listening.

In order to eliminate the need to wear earphones or headphones, it is conceivable to synthesize a virtual sound field using a wavefront synthesis technology, but in this case, it is necessary to prepare a large-scale speaker array, which is not realistic.

Thus, an object of the present invention is to provide an acoustic system for a user, by way of example, who uses a seat of an airplane or an automobile, which reproduces a sound that cannot be heard by surrounding users without using earphones or headphones.

Solution to Problem

One aspect of the present invention is an acoustic system including a speaker system including one speaker unit that emits a sound based on an acoustic signal of a predetermined sound source, in which a sound emitted from the speaker unit is hearable in a region to be audible near the speaker unit, and by a sound emitted from the speaker unit in a back surface direction coming around to a front surface direction, the sound emitted from the speaker unit in the front surface direction and the sound emitted from the speaker unit in the back surface direction cancel each other in a region in the front surface direction far from the speaker unit.

Advantageous Effects of Invention

According to the present invention, it is possible to reproduce a sound that can be heard only in a very limited narrow range.

DESCRIPTION OF EMBODIMENTS

Figure 1:
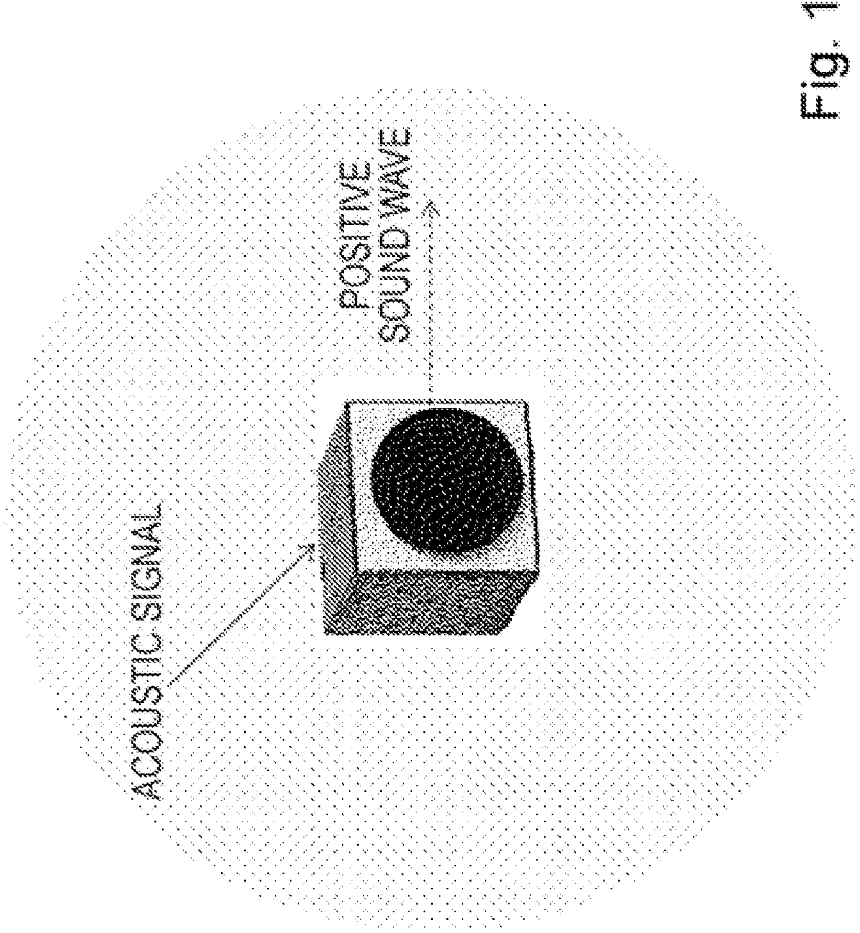
FIG. 1 is a diagram for describing directivity of a sound emitted from a speaker.

Hereinafter, embodiments of the present invention will be described in detail. Note that components having the same functions are denoted by the same reference numerals, and redundant description will be omitted.

TECHNICAL BACKGROUND

First, the directivity of a sound emitted from a speaker will be described. Next, the directivity of a sound emitted from the speaker unit pair of the invention of the present application will be described. Finally, results of experiments for confirming the effects of the speaker unit pair of the invention of the present application will be described.

«1: Directivity of Sound Emitted from Speaker»

Typically, a speaker includes a speaker unit and a speaker box. The speaker unit is a component including a diaphragm that converts an acoustic signal, which is an electric signal, into vibration of air (that is, generates a sound wave). In addition, the speaker box is a component that houses the speaker unit.

When the acoustic signal is input to the speaker, the diaphragm of the speaker unit vibrates, and sound waves are emitted in both directions in which the diaphragm vibrates. Here, a sound wave radiated to the outside of the speaker box (that is, the front surface direction of the speaker unit) is referred to as a positive sound wave, and a sound wave radiated to the inside of the speaker box (that is, the back surface direction of the speaker unit) is referred to as a negative sound wave. The negative sound wave is a sound wave having a phase opposite to the phase of the positive sound wave. FIG. 1 is a diagram for describing directivity of a sound emitted from a speaker. As illustrated in FIG. 1, the positive sound wave is radiated from the speaker in all directions, while the negative sound wave does not exit the speaker box. As a result, the sound emitted from the speaker can be heard in a wide range.

«2: Directivity of Sound Emitted from Speaker Unit Pair»

Figure 2:
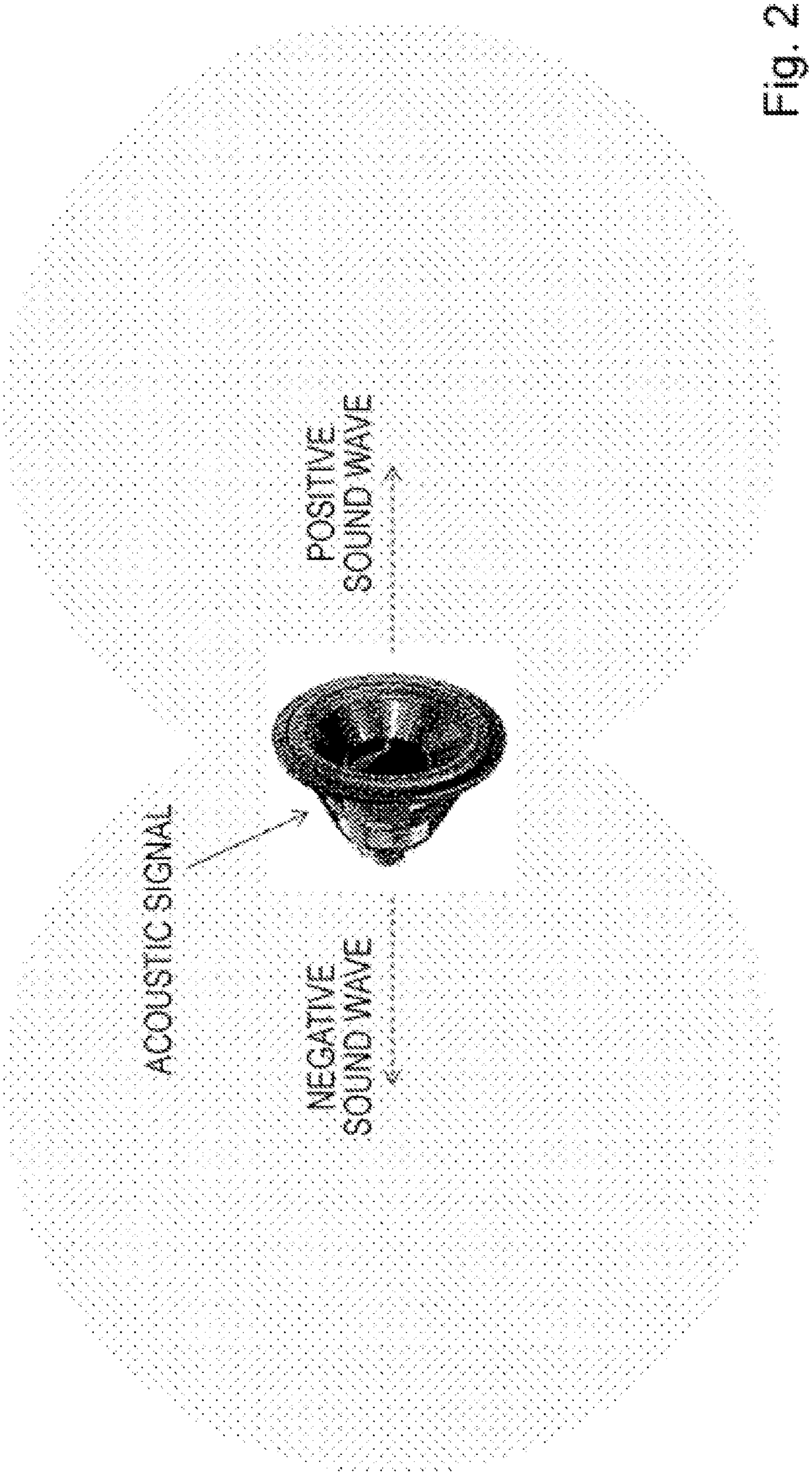
FIG. 2 is a diagram for describing directivity of a sound emitted from a speaker unit.

Here, first, the directivity of a sound emitted from the speaker unit, which is a bare speaker, will be described. FIG. 2 is a diagram for describing directivity of a sound emitted from a speaker unit. In the case of only the speaker unit, a negative sound wave is radiated from the back surface of the speaker unit hidden in the speaker box, unlike the case of the speaker. Therefore, as illustrated in FIG. 2, the sound emitted from the speaker unit has a characteristic of bidirectivity.

Figure 3:
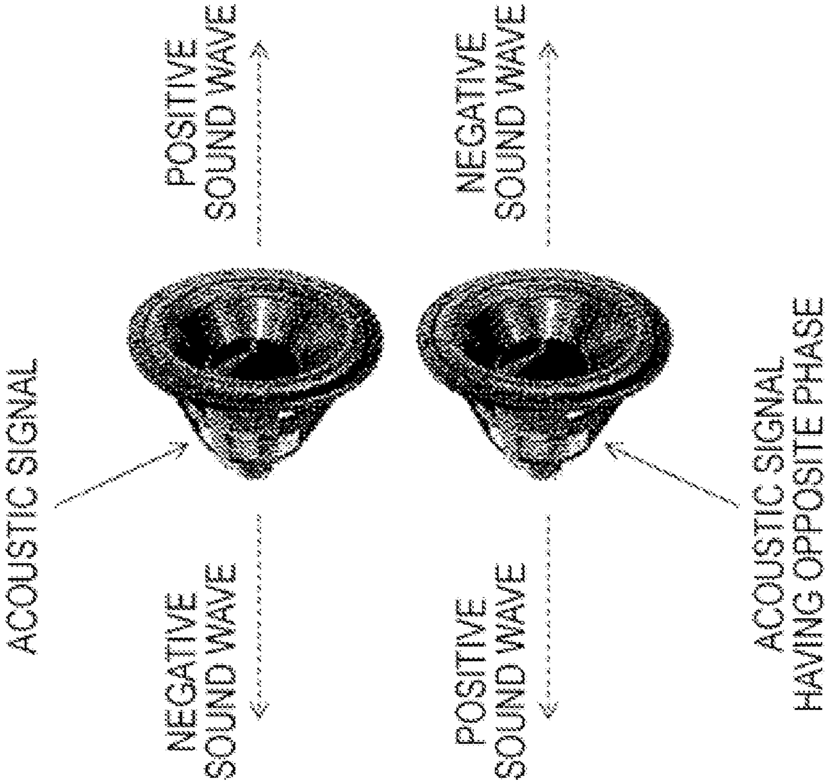
FIG. 3 is a diagram for describing a sound emitted from a speaker unit pair.
Figure 4:
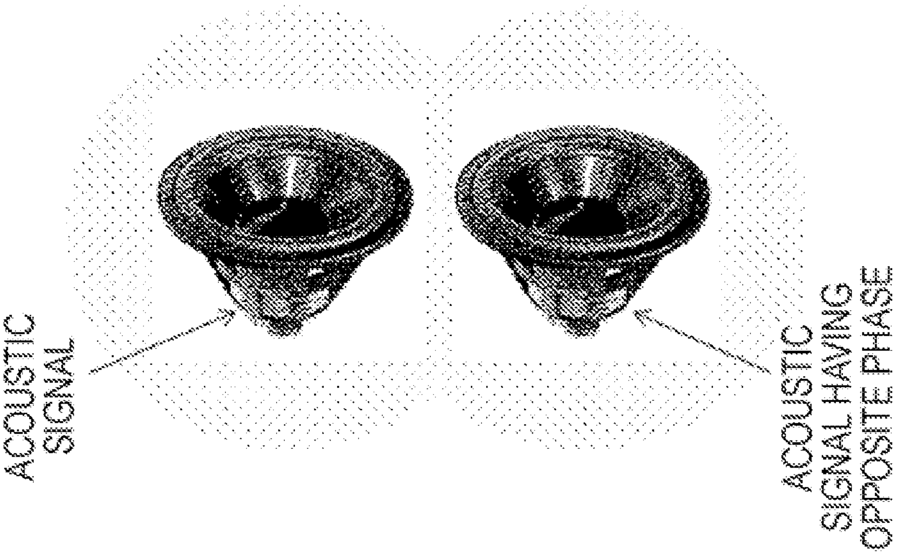
FIG. 4 is a diagram for describing directivity of a sound emitted from a speaker unit pair.

In the invention of the present application, this bidirectivity is used. Hereinafter, a specific description will be given. First, as illustrated in FIG. 3, two speaker units are arranged to form a speaker unit pair. When two acoustic signals having an opposite positive and negative relationship are input to the speaker unit pair, the diaphragms of the two speaker units vibrate, and sounds based on the two acoustic signals are emitted. Then, as illustrated in FIG. 4, a sound in all directions except for the vicinity of the speaker unit pair is erased. In other words, the sound is erased only at a position sufficiently away from the speaker unit pair, and the sound is not erased in the vicinity of the speaker unit pair. The reason why the sound is not erased in the vicinity of the speaker unit pair is that the phases of the sound wave radiated from the front surface of the speaker unit and the sound wave coming around from the back surface do not match in the vicinity of the speaker unit pair.

That is, by utilizing a property that the sound is heard only in the vicinity of the speaker unit pair when a predetermined acoustic signal is input to one speaker unit constituting the speaker unit pair and an acoustic signal having a phase opposite to that of the predetermined acoustic signal is input to the other speaker unit, it is possible to create a situation in which only a user in the vicinity of the speaker unit pair can hear the sound and other users can not hear the sound.

«3: Experimental Results»

Figure 5:
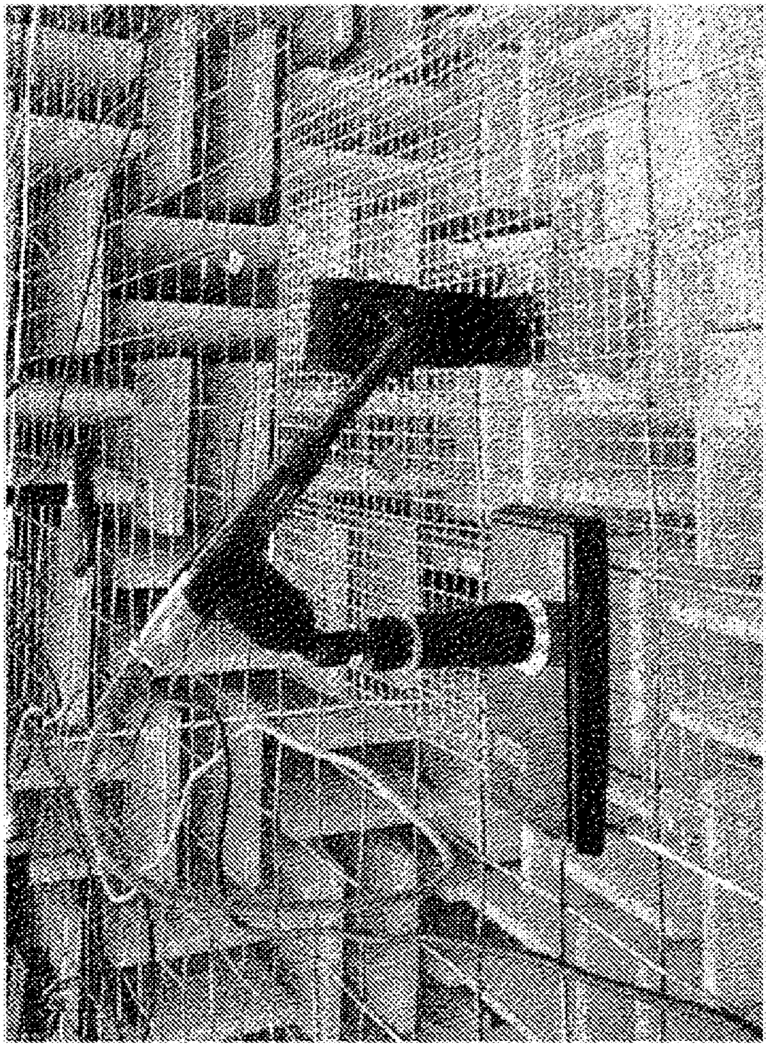
FIG. 5 is a diagram illustrating a state of an experiment (positional relationship between a speaker and a microphone).
Figure 6:
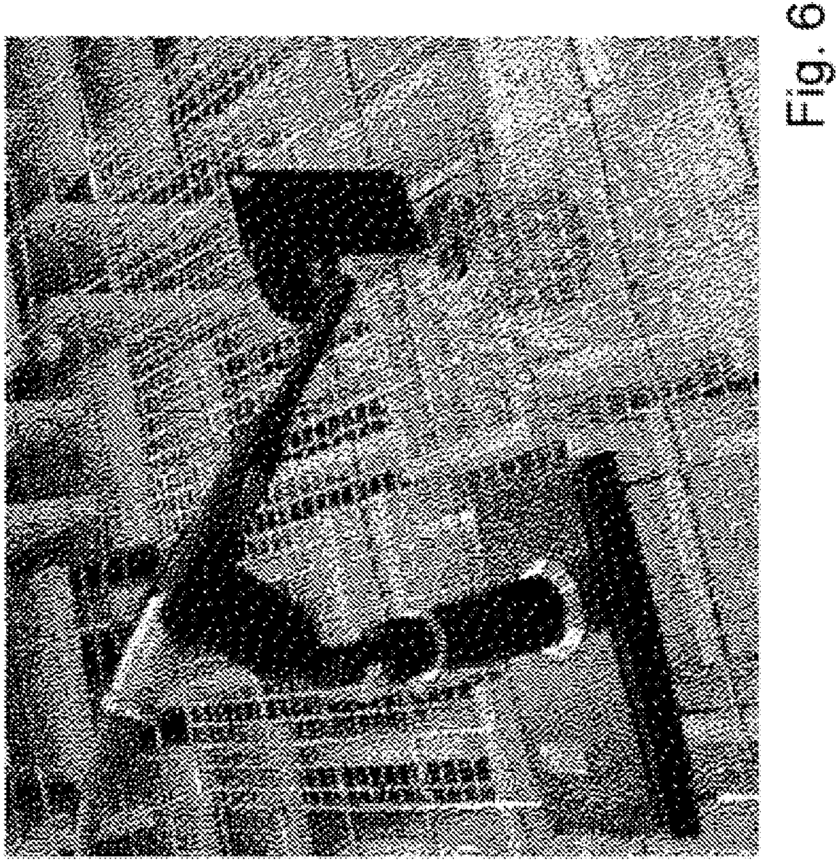
FIG. 6 is a diagram illustrating a state of an experiment (positional relationship between a speaker unit and a microphone).
Figure 7:
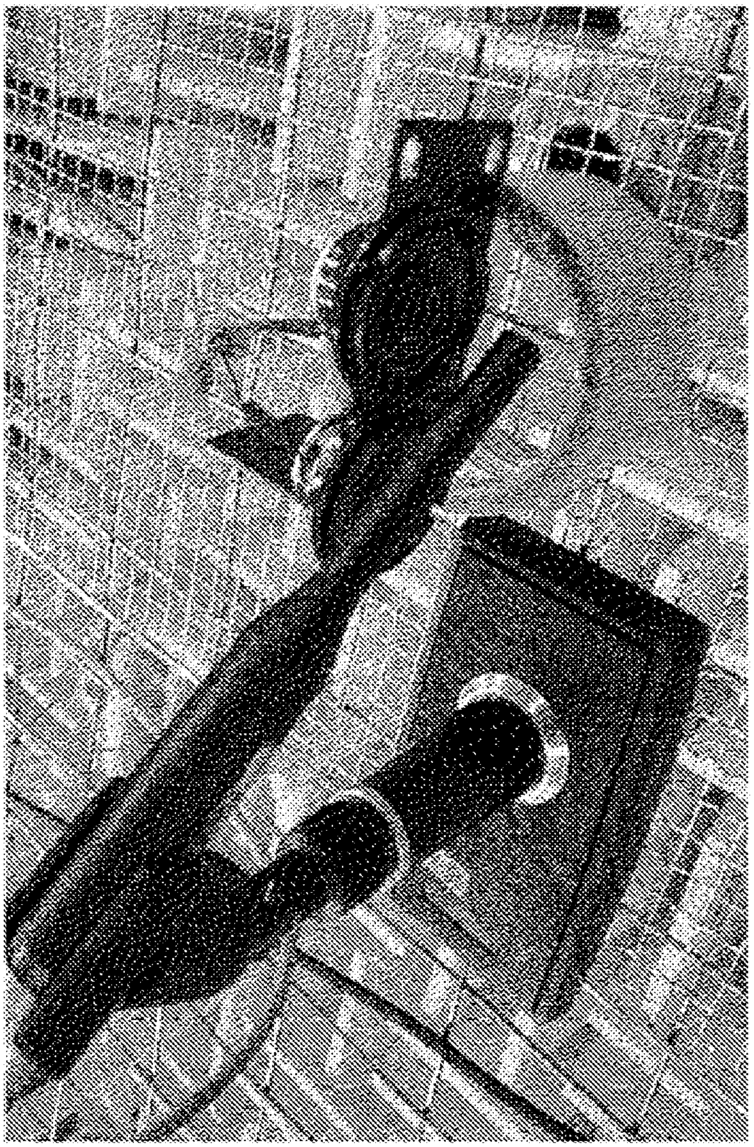
FIG. 7 is a diagram illustrating a state of an experiment (positional relationship between a speaker unit pair and a microphone).

Here, results of experiments for measuring frequency characteristics of a speaker, a speaker unit, and a speaker unit pair will be described. In the experiments, as a speaker, a speaker unit, and a speaker unit pair, a speaker having a diaphragm with a diameter of 4.5 cm (see FIG. 5), a speaker unit obtained by removing the speaker box from the speaker (see FIG. 6), and a speaker unit pair including the two speaker units (see FIG. 7) were used. In addition, to measure frequency characteristics in the vicinity of the speaker, the speaker unit, and the speaker unit pair, a microphone was installed under the following four conditions.

Figure 8:
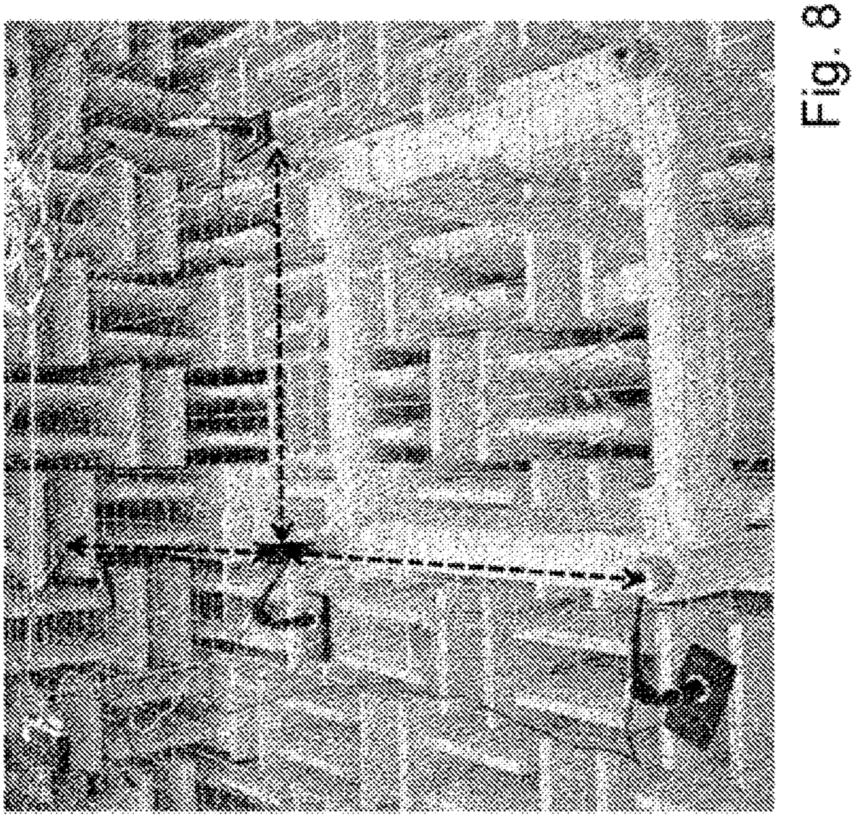
FIG. 8 is a diagram illustrating a state of an experiment (other measurement positions).
Figure 9:
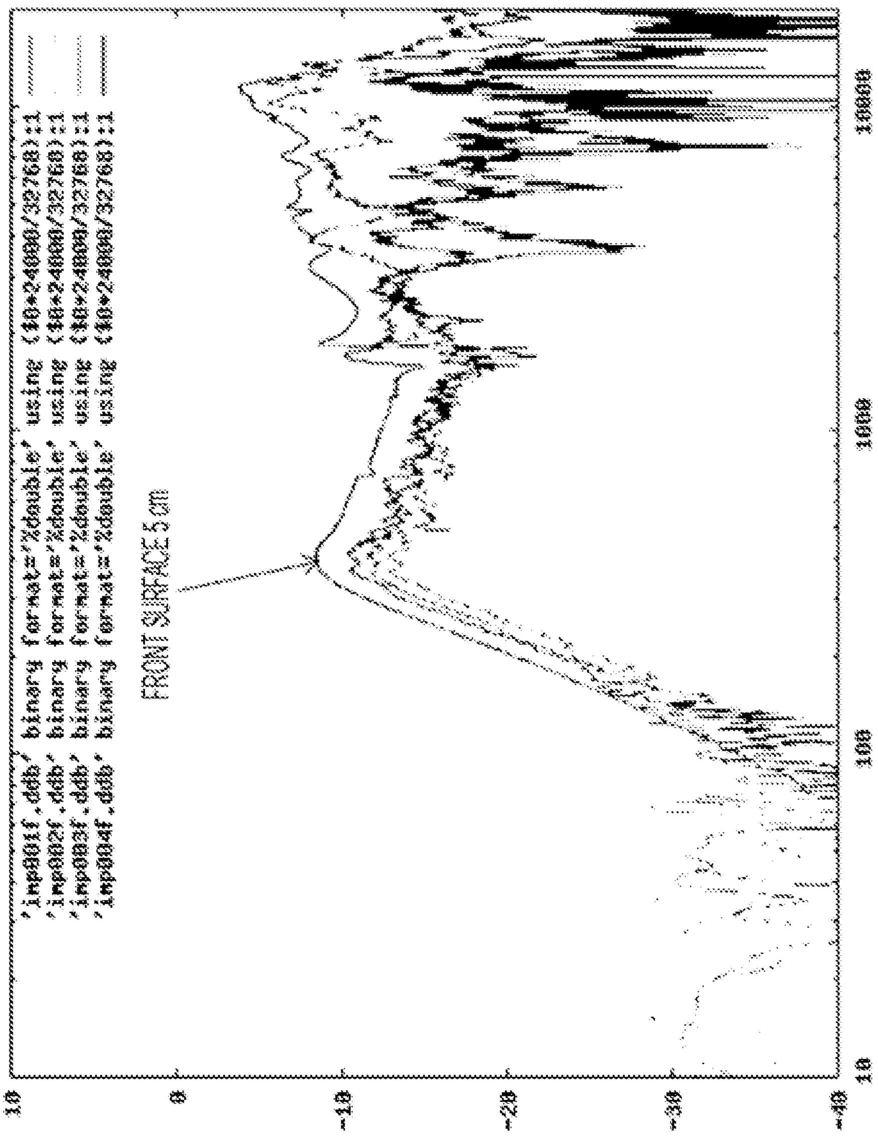
FIG. 9 is a diagram illustrating an experimental result (Condition 1).
Figure 10:
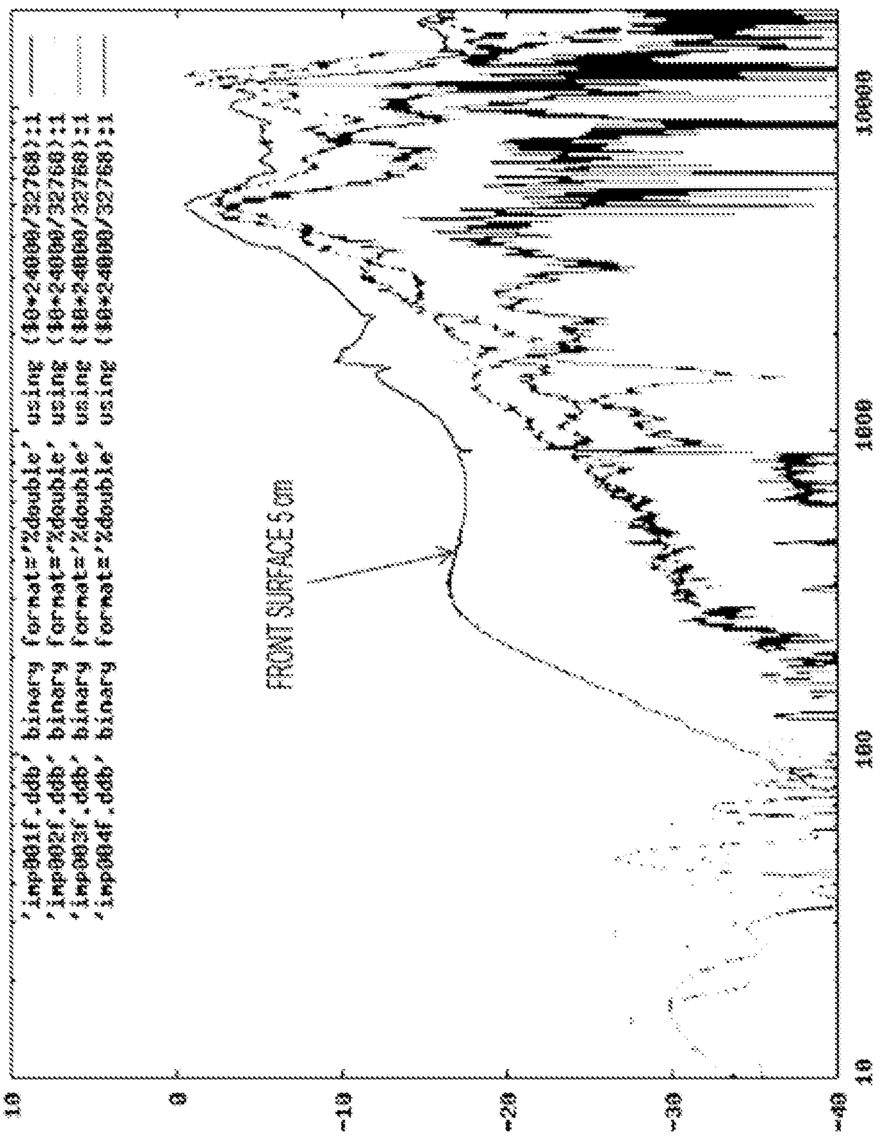
FIG. 10 is a diagram illustrating an experimental result (Condition 2).
Figure 11:
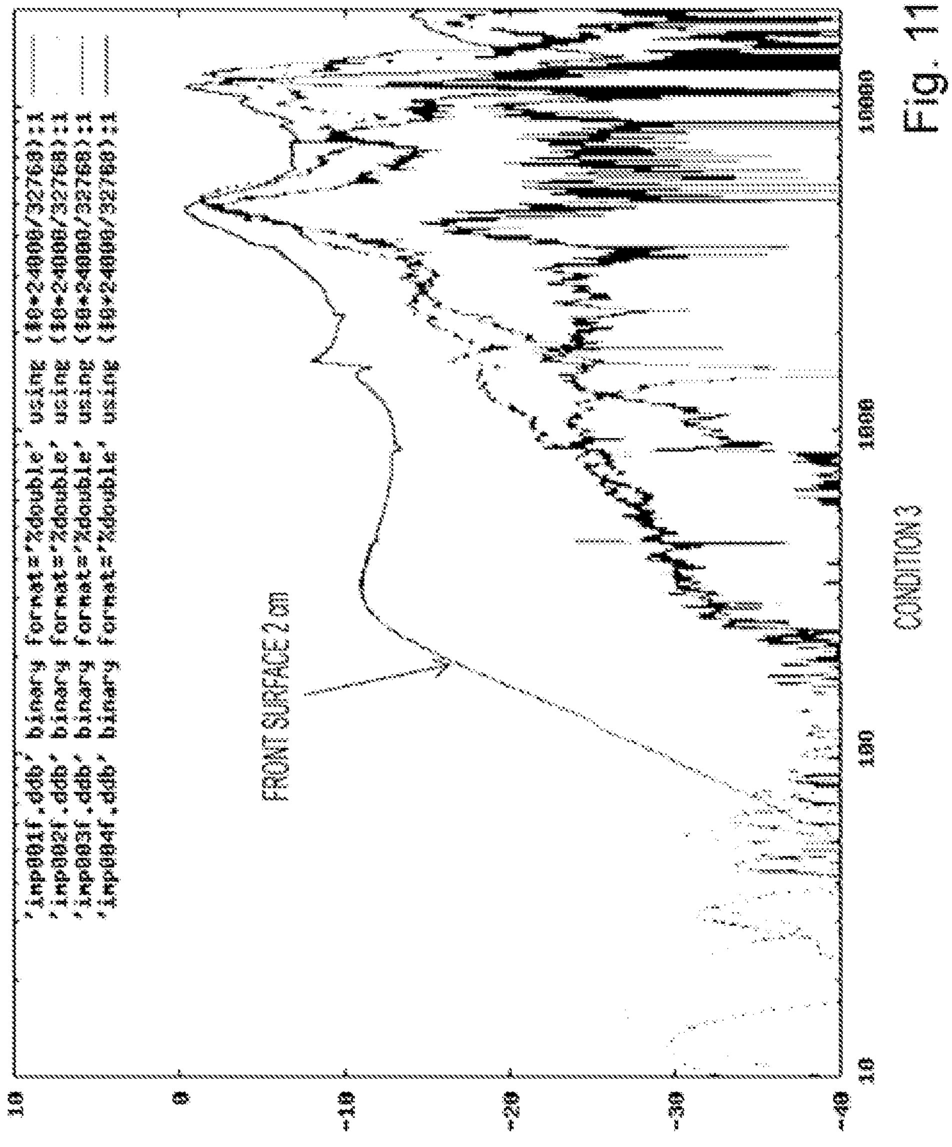
FIG. 11 is a diagram illustrating an experimental result (Condition 3).
Figure 12:
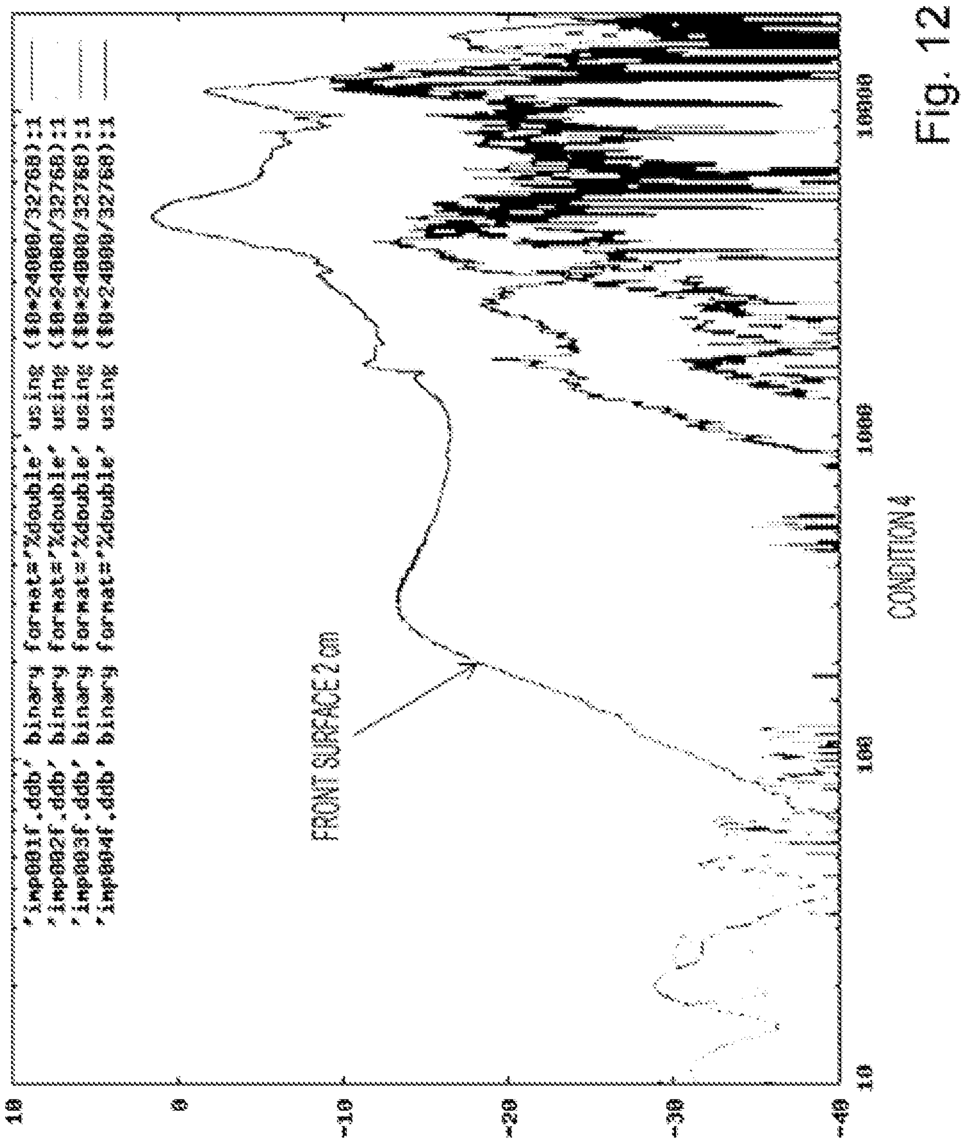
FIG. 12 is a diagram illustrating an experimental result (Condition 4).

(Condition 1) Position of 5 cm from the front surface of the speaker (Condition 2) Position of 5 cm from the front surface of the speaker unit (Condition 3) Position of 2 cm from the front surface of the speaker unit (Condition 4) Position of 2 cm from the front surface of the speaker unit pair In addition, for comparison under any of the conditions, microphones were also installed at positions of 100 cm from the front surface, back surface, and side surface of the speaker, the speaker unit, and the speaker unit pair (see FIG. 8).

Hereinafter, experimental results will be described. FIGS. 9, 10, 11, and 12 are diagrams illustrating experimental results, and are diagrams illustrating relationships between frequencies and attenuation under Conditions 1, 2, 3, and 4. In each drawing, four curves are illustrated, one curve indicated by an arrow is obtained by collecting a sound with the microphone at the position of 5 cm or 2 cm from the front surface, and the other three curves are obtained by collecting sounds with the microphones at the position of 100 cm from the front surface, the back surface, and the side surface. Note that the position of 5 cm or 2 cm from the front surface is located in the vicinity of the speaker or the like and thus the curve at the position of 5 cm or 2 cm from the front surface has a very large gain. Therefore, the curve at the position of 5 cm from the front surface is plotted at −25 dB from the three curves at the position of 100 cm for the sake of easy viewing. Similarly, the curve at the position of 2 cm from the front surface is plotted at −32 dB. Comparing FIG. 9 with FIG. 10, it can be seen that there is almost no difference between the four curves when the speaker is used, whereas there is a difference between the curve at the position of 5 cm from the front surface and the other three curves when the speaker unit is used. This difference is more remarkable in a lower frequency range. In addition, comparing FIG. 11 with FIG. 12, it can be seen that the speaker unit pair has a larger difference between the curve at the position of 2 cm from the front surface and the other three curves than the speaker unit.

As described above, it was confirmed from the experiments that the sound emitted from the speaker unit pair of the invention of the present application can be heard only in the vicinity of the speaker unit pair.

First Embodiment

A system that reproduces an acoustic signal obtained on the basis of a reproduction target is referred to as an acoustic system. The acoustic system includes a speaker system for emitting the acoustic signal as a sound (hereinafter, this sound is referred to as a sound based on the acoustic signal). Here, the speaker system is a device that converts the acoustic signal that is an analog signal into the sound. In addition, the reproduction target is, for example, data or a signal from which an acoustic signal can be obtained by predetermined processing, such as data recorded in a CD, a DVD, or a record, data received through the Internet, or a signal received through radio broadcasting or television broadcasting.

Figure 13:
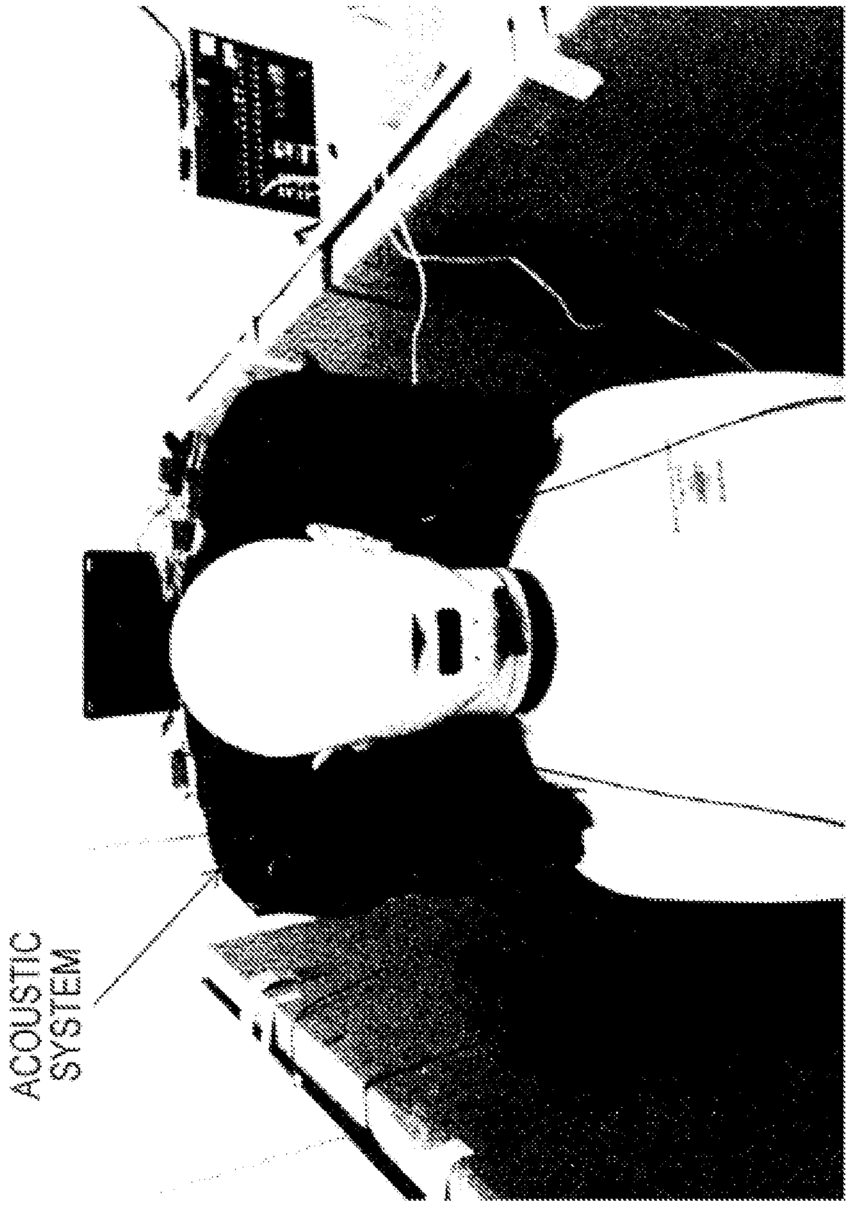
FIG. 13 is a diagram illustrating an example of an acoustic system installed in a seat of an aircraft.

Here, a description will be given of the acoustic system that reproduces a sound based on an acoustic signal obtained from the reproduction target so that only a user in the vicinity of the speaker system can hear the sound. That is, the reproduced sound of the acoustic system cannot be heard by users other than the user in the vicinity of the speaker system. When such an acoustic system is used, for example, as an acoustic system for a user who uses a seat of an aircraft, it is possible to provide a system in which only the user who uses the seat can hear the reproduced sound. FIG. 13 is a diagram illustrating an example of an acoustic system installed in a seat of an aircraft. The acoustic system in FIG. 13 is installed on the seat to sandwich the head of the seated user, and two speaker unit pairs are arranged to be near the left and right ears. Note that such an acoustic system can also be installed in vehicles other than aircrafts such as automobiles and trains, a reclining chair, and the like, and can also be installed in a wearable form such as being placed on a shoulder. In addition, a driver unit pair in which two driver units corresponding to the above-described speaker unit pair are arranged may be installed in each of left and right units of headphones and earphones. The headphones are generally roughly classified into two types, an open-type (open-air type) and a closed-back type (closed-type), and when the above-described technology is applied particularly to the open-type in which there is a concern about sound leakage, the sound leakage is expected to be reduced.

Figure 14:
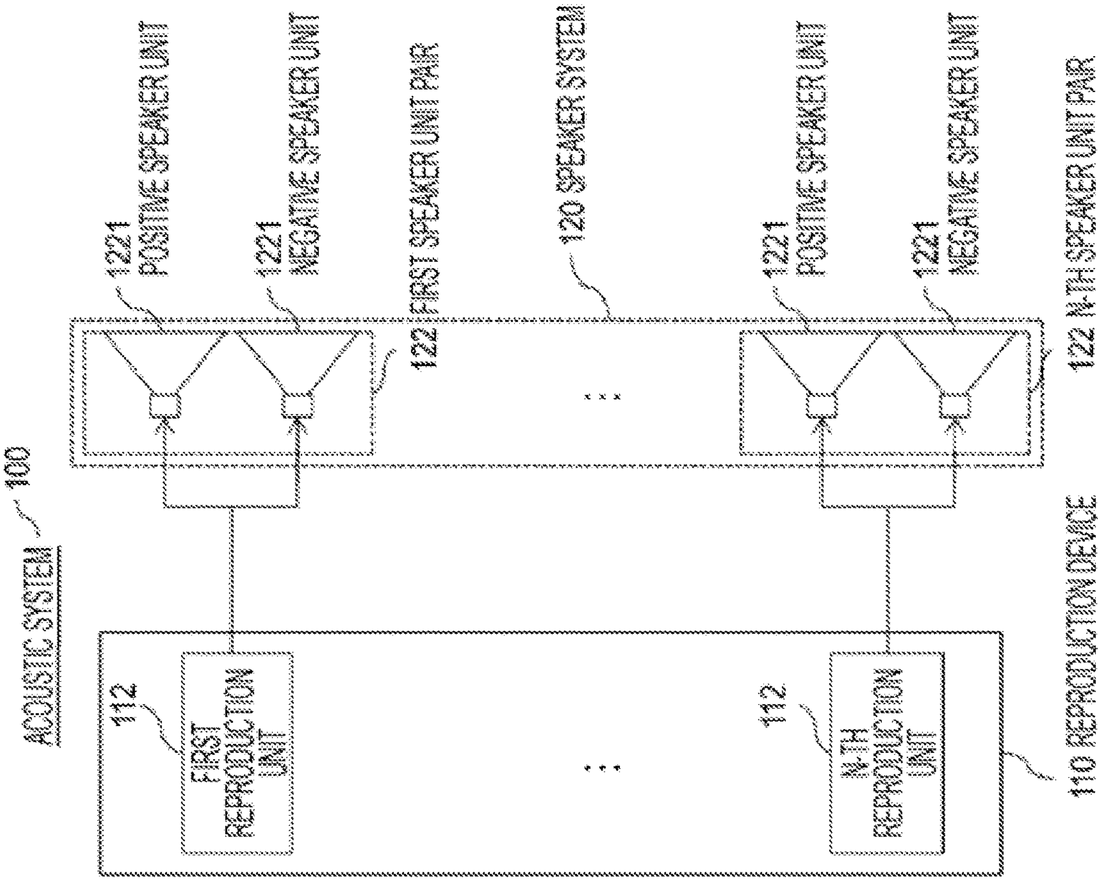
FIG. 14 is a block diagram illustrating an example of a configuration of an acoustic system 100.

Hereinafter, an acoustic system 100 will be described with reference to FIG. 14. FIG. 14 is a block diagram illustrating a configuration of the acoustic system 100. As illustrated in FIG. 14, the acoustic system 100 includes a reproduction device 110 and a speaker system 120. The reproduction device 110 includes N (where N is an integer of 1 or more) reproduction units 112 (that is, a first reproduction unit 112, . . . , and an N-th reproduction unit 112). In addition, the speaker system 120 also includes N speaker unit pairs 122 (that is, a first speaker unit pair 122, . . . , and an N-th speaker unit pair 122). Each speaker unit pair 122 includes two speaker units (that is, a positive speaker unit 1221 and a negative speaker unit 1221). An acoustic signal having a phase opposite to that of an acoustic signal input to the positive speaker unit 1221 is input to the negative speaker unit 1221. The speaker system 120 is installed at a position close to the head of the user who uses the seat.

Note that a direction in which the n-th speaker unit pair 122 faces the user is defined as an n-th user direction (n=1, . . . , N), and the positive speaker unit 1221 and the negative speaker unit 1221 of the n-th speaker unit pair 122 (n=1, . . . , N) are arranged so that a sound emitted from the positive speaker unit 1221 in a direction opposite to the n-th user direction and a sound emitted from the negative speaker unit 1221 in the direction opposite to the n-th user direction are transmitted in the n-th user direction by coming around. Here, the n-th user direction is a front surface direction of the positive speaker unit 1221 and the negative speaker unit 1221 of the n-th speaker unit pair 122. In addition, the direction opposite to the n-th user direction is a back surface direction of the positive speaker unit 1221 and the negative speaker unit 1221 of the n-th speaker unit pair 122.

In addition, the positive speaker unit 1221 and the negative speaker unit 1221 of the n-th speaker unit pair 122 (n=1, . . . , N) are arranged in a positional relationship in which a sound emitted from the positive speaker unit 1221 and a sound emitted from the negative speaker unit 1221 are mutually erased so that the sounds cannot be heard by a user who uses another seat.

Hereinafter, an operation of the acoustic system 100 will be described with reference to FIG. 14.

The reproduction device 110 receives, as input, a first acoustic signal, a third acoustic signal, . . . , and a (2N−1)-th acoustic signal, which are acoustic signals obtained on the basis of the reproduction target, and outputs the first acoustic signal, a second acoustic signal, . . . , and a 2N-th acoustic signal. More specifically, the n-th reproduction unit 112 (n=1, . . . , N) receives, as input, a (2n−1)-th acoustic signal, generates a 2n-th acoustic signal, which is an acoustic signal having a phase opposite to that of the (2n−1)-th acoustic signal from the (2n−1)-th acoustic signal, and outputs the (2n−1)-th acoustic signal and the 2n-th acoustic signal. The (2n−1)-th acoustic signal and the 2n-th acoustic signal are input to the positive speaker unit 1221 and the negative speaker unit 1221 of the n-th speaker unit pair 122, respectively.

The speaker system 120 receives, as input, the first acoustic signal, the second acoustic signal, . . . , and the 2N-th acoustic signal output from the reproduction device 110, and emits a first acoustic signal-based sound, a second acoustic signal-based sound, . . . , and a 2N-th acoustic signal-based sound. More specifically, the n-th speaker unit pair 122 (n=1, . . . , N) emits a sound based on the (2n−1)-th acoustic signal from the positive speaker unit 1221, and emits a sound based on the 2n-th acoustic signal from the negative speaker unit 1221, with the (2n−1)-th acoustic signal and the 2n-th acoustic signal as inputs. Since the (2n−1)-th acoustic signal and the 2n-th acoustic signal are in opposite phase relationship with each other, the sound is heard only in the vicinity of the seat where the speaker system 120 is installed as described in <Technical Background>. For example, in the case of N=2, when the first acoustic signal and the third acoustic signal are respectively a right-channel acoustic signal and a left-channel acoustic signal of a certain sound source, a stereo sound can be heard only in the vicinity of the seat where the speaker system 120 is installed.

Note that the sound emitted from the positive speaker unit 1221 of the n-th speaker unit pair 122 in the n-th user direction and the sound emitted from the positive speaker unit 1221 of the n-th speaker unit pair 122 in the direction opposite to the n-th user direction are in mutually opposite phase relationship. Similarly, the sound emitted from the negative speaker unit 1221 of the n-th speaker unit pair 122 in the n-th user direction and the sound emitted from the negative speaker unit 1221 of the n-th speaker unit pair 122 in the direction opposite to the n-th user direction are in mutually opposite phase relationship.

According to the embodiment of the present invention, it is possible to reproduce a sound that can be heard only in a very limited narrow range such as the vicinity of the speaker system.

Second Embodiment

In the present embodiment, an acoustic system to which experimental results of Condition 2 and Condition 3 described in <Technical Background> are applied will be described. That is, the acoustic system of the present embodiment is configured using a speaker system including one speaker unit.

Figure 15:
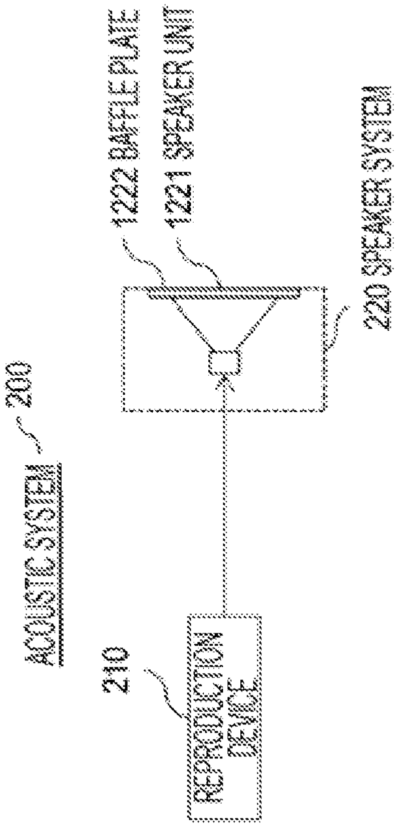
FIG. 15 is a block diagram illustrating an example of a configuration of an acoustic system 200.

Hereinafter, an acoustic system 200 will be described with reference to FIG. 15. FIG. 15 is a block diagram illustrating a configuration of the acoustic system 200. As illustrated in FIG. 15, the acoustic system 200 includes a reproduction device 210 and a speaker system 220. The speaker system 220 includes one speaker unit 1221 to which a baffle plate 1222 is attached.

Figure 16:
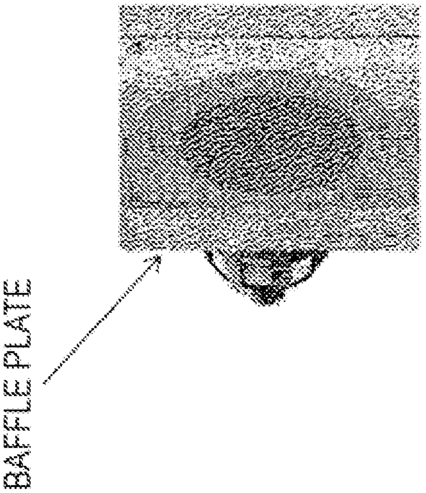
FIG. 16 is a diagram illustrating an example of a configuration of a speaker unit 1221 to which a baffle plate 1222 is attached.

The baffle plate 1222 is a member for elongating a path along which the sound emitted from the speaker unit 1221 in the direction opposite to the user direction (that is, the back surface direction) comes around to the user direction (that is, the front surface direction), that is, for preventing the sound from coming around from the back surface of the speaker unit (see FIG. 16). A range (what is called a sweet spot) in which the sound emitted from the speaker unit 1221 to which the baffle plate 1222 is attached can be heard is larger than a range in which the sound emitted from the speaker unit 1221 to which the baffle plate 1222 is not attached can be heard. Therefore, when the sweet spot is sufficiently large, it is not necessary to attach the baffle plate 1222 to the speaker unit 1221.

Hereinafter, operation of the acoustic system 200 will be described with reference to FIG. 15.

The reproduction device 210 outputs an acoustic signal obtained on the basis of the object to be reproduced.

The speaker system 220 receives the sound signal output from reproduction device 210 as input, and emits sound based on the acoustic signal. The sound emitted from the speaker unit 1221 can be heard in a region to be audible (that is, the vicinity of the speaker unit 1221 in the front surface direction) near the speaker unit 1221, and cannot be heard in other regions (for example, a region in the front surface direction far from the speaker unit 1221 and a region in a side direction of the speaker unit 1221). A reason why the sound cannot be heard in the region in the front surface direction far from the speaker unit 1221 while the sound can be heard in the vicinity in the front surface direction of the speaker unit 1221 is that the sound emitted from the speaker unit 1221 in the user direction and the sound emitted from the speaker unit 1221 in the direction opposite to the user direction are in mutually opposite phase relationship, and the sound emitted from the speaker unit 1221 in the direction opposite to the user direction comes around to the user direction, so that the sound emitted from the speaker unit 1221 in the user direction and the sound emitted from the speaker unit 1221 in the direction opposite to the user direction do not cancel each other in the vicinity in the front surface direction of the speaker unit 1221, but cancel each other in the region in the front surface direction far from the speaker unit 1221. In addition, as described above, the baffle plate 1222 is a member for elongating the path along which the sound emitted from the speaker unit 1221 in the back surface direction comes around to the front surface direction of the speaker unit 1221, and the region to be audible becomes larger as the size of the baffle plate 1222 becomes larger.

Figure 17:
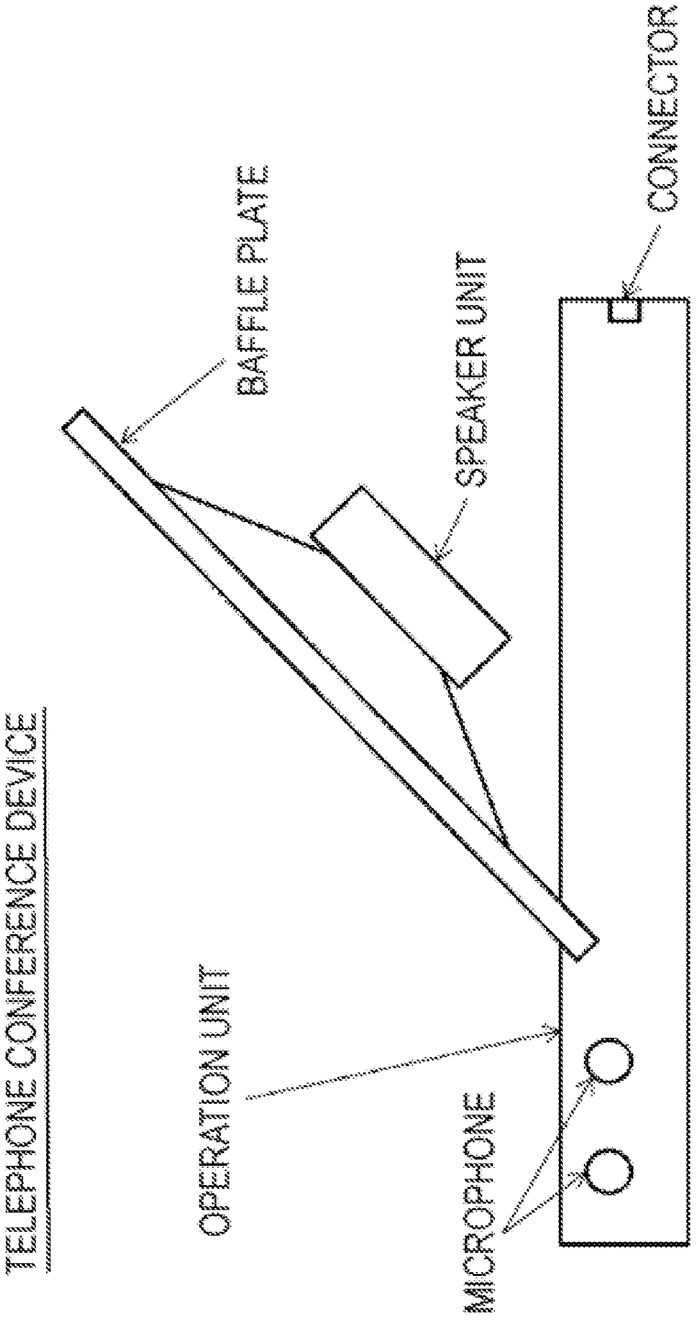
FIG. 17 is a block diagram illustrating an example of a configuration of a telephone conference device to which the acoustic system 200 is applied.

Note that the acoustic system 200 may include a microphone (not illustrated) for collecting the user's voice. The microphone is installed in a region other than the region to be audible. By installing the microphone in a region other than the region to be audible, the microphone collects only the user's voice without collecting the sound emitted from the speaker unit 1221. FIG. 17 is a diagram illustrating an example of a configuration of a telephone conference device to which the acoustic system 200 is applied. In addition to the speaker unit to which the baffle plate is attached, the telephone conference device of FIG. 17 includes a microphone for collecting user's voice, a connector for connecting a cable for taking in an acoustic signal from a remote place, or the like, and an operation unit for operating the telephone conference device. The size of the baffle plate may be determined in consideration of a design allowable size of the telephone conference device in addition to a size of the region to be audible. Furthermore, in order to shorten the distance between the region to be audible and the telephone conference device, the speaker unit may form a predetermined angle with respect to the ground plane of the telephone conference device. In addition, the microphone may be arranged in the front surface direction (that is, the side on which the user is located) of the speaker unit in a region other than the region to be audible in order to easily collect the user's voice. In addition, in a case of the telephone conference device having an echo cancellation function, microphones for collecting reference sounds and error sounds may also be arranged in the front surface direction. In addition, a member for holding the speaker unit may be attached to the back surface of the speaker unit, and in this case, for example, a member having a mesh structure may be used in order to prevent coming around of the sound emitted from the back surface direction of the speaker unit to the front surface direction from being obstructed.

According to the embodiment of the present invention, it is possible to reproduce a sound that can be heard only in a very limited narrow range such as the vicinity of the speaker system.

SUPPLEMENT

The above-described description of the embodiments of the present invention has been presented for purposes of illustration and description. There is no intention to be exhaustive or to limit the invention to the precise form disclosed. Modifications and variations are possible from the above teaching. The embodiments have been chosen and represented in order to provide the best illustration of the principles of the present invention and to enable those skilled in the art to utilize the present invention in various embodiments and by adding various modifications to be suited for contemplated practical use. All such modifications and variations are within the scope of the present invention as defined by the appended claims, interpreted in accordance with a fairly and legally equitable breadth.

The invention claimed is:

1. An acoustic system comprising:

a speaker system including a speaker unit that emits a sound based on an acoustic signal of a predetermined sound source, wherein a sound emitted from the speaker unit is hearable in a region to be audible near the speaker unit, a member that holds the speaker unit without being housed in a speaker box is attached to the speaker unit, and by a sound emitted from the speaker unit in a back surface direction coming around to a front surface direction, the sound emitted from the speaker unit in the front surface direction and the sound emitted from the speaker unit in the back surface direction cancel each other in a region in the front surface direction far from the speaker unit, wherein the acoustic system further comprising microphones for collecting a voice of a user, the microphones being installed in a region other than the region to be audible, the speaker unit forms a predetermined angle obliquely with respect to a ground plane of the acoustic system, and the microphones are arranged on a plane parallel to the ground plane of the acoustic system and location of the microphones are below location of the speaker unit.

2. The acoustic system according to claim 1, wherein a baffle plate is attached to the speaker unit, the baffle plate is a member that elongates a path along which a sound emitted from the speaker unit in the back surface direction comes around to the front surface direction of the speaker unit, and the region to be audible increases as a size of the baffle plate increases.

* * * * *